US012764389B2

(12) United States Patent
Xu et al.

(10) Patent No.: US 12,764,389 B2
(45) Date of Patent: Oct. 13, 2026

(54) METHOD, APPARATUS, ELECTRONIC DEVICE AND STORAGE MEDIUM FOR DISPLAYING A TEXT EFFECT

(71) Applicant: Beijing Bytedance Network Technology Co., Ltd., Beijing (CN)

(72) Inventors: Jiancong Xu, Beijing (CN); Mingxu Ding, Beijing (CN); Xiang Liu, Beijing (CN); Wenjing Tang, Beijing (CN); Yingpeng Li, Beijing (CN); Liyang Qi, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 318 days.

(21) Appl. No.: 18/291,753

(22) PCT Filed: Oct. 21, 2022

(86) PCT No.: PCT/CN2022/126579
§ 371 (c)(1),
(2) Date: Jan. 24, 2024

(87) PCT Pub. No.: WO2023/071920
PCT Pub. Date: May 4, 2023

(65) Prior Publication Data

US 2024/0357210 A1 Oct. 24, 2024

(30) Foreign Application Priority Data

Oct. 26, 2021 (CN) ......................... 202111250376.4

(51) Int. Cl.
*H04N 21/485* (2011.01)
*H04N 21/2187* (2011.01)
(Continued)

(52) U.S. Cl.
CPC ..... *H04N 21/4858* (2013.01); *H04N 21/4316* (2013.01); *H04N 21/44008* (2013.01);
(Continued)

(58) Field of Classification Search
CPC ........... H04N 21/4858; H04N 21/4316; H04N 21/44008; H04N 21/2187; H04N 21/4788;
(Continued)

(56) References Cited

U.S. PATENT DOCUMENTS 8,477,998 B1 * 7/2013 Kim .................... G06F 18/2185 382/118
10,339,955 B2 * 7/2019 Homma ................. G09B 19/06
(Continued)

FOREIGN PATENT DOCUMENTS

CN 105100927 A 11/2015
CN 105430471 A 3/2016
(Continued)

OTHER PUBLICATIONS

International Search Report and Written Opinion, International Patent Application No. PCT/CN2022/126579, Jan. 18, 2023, with English translation of Search Report (8 pages).
(Continued)

*Primary Examiner* — Sahar Aqil Riaz
(74) *Attorney, Agent, or Firm* — Fish & Richardson P.C.

(57) ABSTRACT

A method, apparatus, electronic device and storage medium for displaying a text effect. In the method, in response to determining that text information to be displayed and a text display parameter are obtained, a video image for displaying the text information to be displayed is obtained; key location points of a target object in the video image are identified and a display path of the text to be displayed is determined based on the key location points; and based on the text display
(Continued)

parameter, the text information to be displayed is displayed dynamically according to the display path.

18 Claims, 9 Drawing Sheets

(51) Int. Cl.

| | |
|---|---|
| ***H04N 21/431*** | (2011.01) |
| ***H04N 21/44*** | (2011.01) |
| ***H04N 21/4788*** | (2011.01) |
| ***H04N 21/488*** | (2011.01) |

(52) U.S. Cl.
CPC ..... *H04N 21/2187* (2013.01); *H04N 21/4788* (2013.01); *H04N 21/4884* (2013.01)

(58) Field of Classification Search
CPC ............. H04N 21/4884; H04N 21/431; H04N 21/475; H04N 21/488
USPC ............................................................ 725/32
See application file for complete search history.

(56) References Cited

U.S. PATENT DOCUMENTS

| | | | | |
|---|---|---|---|---|
| 10,375,375 | B2 * | 8/2019 | Hwang ................ | H04N 13/156 |
| 10,489,918 | B1 * | 11/2019 | Vajapey .................... | G06T 7/20 |
| 12,375,772 | B2 * | 7/2025 | Xu ..................... | H04N 21/4383 |
| 2014/0092096 | A1 * | 4/2014 | Breedvelt-Schouten .................... | G06F 40/143 345/441 |
| 2016/0343171 | A1 * | 11/2016 | Waldman .............. | G06T 19/006 |
| 2018/0332265 | A1 * | 11/2018 | Hwang .............. | H04N 21/8451 |
| 2020/0151884 | A1 * | 5/2020 | Vajapey .................... | G06T 7/20 |
| 2020/0177823 | A1 | 6/2020 | Zhu et al. | |
| 2021/0366175 | A1 * | 11/2021 | Poling ...................... | G06T 11/60 |
| 2022/0021927 | A1 * | 1/2022 | Liang ................... | H04N 21/858 |
| 2022/0076706 | A1 * | 3/2022 | Walker .................. | G06F 3/0482 |
| 2022/0272284 | A1 * | 8/2022 | Chandrashekar .. | H04N 21/4884 |
| 2023/0379428 | A1 * | 11/2023 | Fu ...................... | H04N 21/4782 |
| 2023/0401852 | A1 * | 12/2023 | Kumar ................... | G06V 20/41 |
| 2025/0274638 | A1 * | 8/2025 | Shuai ................. | H04N 21/2542 |

FOREIGN PATENT DOCUMENTS

| | | | |
|---|---|---|---|
| CN | 106101804 | A | 11/2016 |
| CN | 107147941 | A | 9/2017 |
| CN | 108495166 | A | 9/2018 |
| CN | 109862380 | A | 6/2019 |
| CN | 110072141 | A | 7/2019 |
| CN | 112328091 | A | 2/2021 |
| CN | 112347395 | A | 2/2021 |

OTHER PUBLICATIONS

Second Office Action for Chinese Application No. 202111250376.4, mailed on Nov. 29, 2024, 14 pages.
Office Action cited in Chinese Patent Application No. 202111250376.4, Jun. 28, 2024, with machine translation (12 pages).

* cited by examiner

METHOD, APPARATUS, ELECTRONIC DEVICE AND STORAGE MEDIUM FOR DISPLAYING A TEXT EFFECT

CROSS REFERENCE

The present application claims priority to the Chinese Patent Application No. 202111250376.4, filed on Oct. 26, 2021, and the entirety of which is incorporated herein by reference.

FIELD

Embodiments of the present disclosure relates to the field of computer technology, for example, to a method, apparatus, electronic device and storage medium for displaying a text effect.

BACKGROUND

Usually, during the process of a user watching live streams or videos, the user can enter texts in the interactive information input field of the viewing interface to interact with the host or conduct comments and analysis on the watched video. The interactive texts entered by the user will appear in the form of bullet screen comments on the video viewing interface. As more interactive texts are displayed, the text content entered earlier will be removed from the current viewing interface and no longer displayed or displayed in a loop. Users cannot personalize the display effect of text effects, which lacks interest.

SUMMARY

Embodiments of the present disclosure provides a method, apparatus, electronic device and storage medium for displaying a text effect, which can provide an editable text effect display way, so that when the user sending text interactive information, the display effect of the text effect can be set personalized, which increases the interest of displaying the text effect.

In a first aspect, a method of displaying a text effect is provided. In the method, in response to determining that text information to be displayed and a text display parameter are obtained, a video image for displaying the text information to be displayed is obtained: key location points of a target object in the video image are identified and a display path of the text to be displayed is determined based on the key location points; and based on the text display parameter, the text information to be displayed is displayed dynamically according to the display path.

In a second aspect, an apparatus for displaying a text effect is provided. The apparatus comprises: a text effect display data obtaining module configured for, in response to determining that text information to be displayed and a text display parameter are obtained, obtaining a video image for displaying the text information to be displayed: a text effect display path determining module configured for identifying key location points of a target object in the video image and determining a display path of the text to be displayed based on the key location points; and a text effect displaying module configured for displaying, based on the text display parameter, the text information to be displayed dynamically according to the display path.

In a third aspect, an electronic device is provided. The electronic device comprises: one or more processors: a storage device configured to store one or more programs, wherein the one or more programs, when executed by the one or more processors, cause the one or more processors implement the method of displaying a text effect of any of embodiments of the present disclosure.

In a fourth aspect, a storage medium is provided. The storage medium comprises computer-executable instructions, wherein the computer-executable instructions, when executed by a computer processor, are configured to perform the method of displaying a text effect of any of embodiments of the present disclosure.

BRIEF DESCRIPTION OF THE DRAWINGS

Throughout the drawings, the same or similar reference numerals indicate the same or similar elements. It should be understood that the drawings are schematic, and components and elements are not necessarily drawn to scale.

DETAILED DESCRIPTION

It should be understood that multiple steps described in the method implementation of the present disclosure can be executed in different orders and/or in parallel. In addition, the method implementation can include additional steps and/or omit to execute the steps shown. The scope of the present disclosure is not limited in this regard.

The term "including" and its variations used herein are open-ended, i.e. "including but not limited to". The term "based on" means "at least partially based on". The term "one embodiment" means "at least one embodiment": the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, and are not used to limit the order or interdependence of the functions performed by these apparatuses, modules, or units.

It should be noted that the modifications of "one" and "a plurality of" mentioned in this disclosure are illustrative and not restrictive. Those skilled in the art should understand that unless otherwise specified in the context, they should be understood as "one or more".

Figure 1:
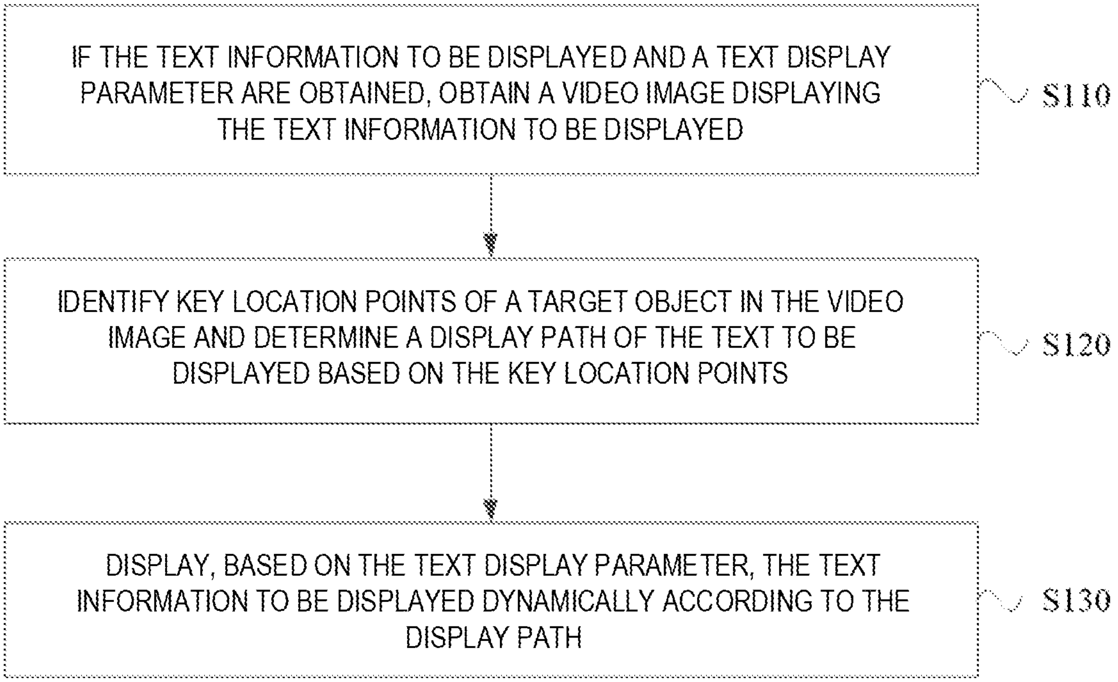
FIG. 1 is a schematic flow diagram of a method of displaying a text effect provided by one embodiment of the present disclosure.

FIG. 1 is a schematic flow diagram of a method of displaying a text effect provided by one embodiment of the present disclosure. Embodiments of the present disclosure are applicable to the case of displaying a text effect in a video image. The method can be performed by an apparatus for displaying a text effect and the apparatus can be implemented in the form of software and/or hardware. The apparatus can be configured in an electronic device, such as a mobile terminal or a server device.

As shown in FIG. 1, the method of displaying a text effect provided by the present embodiment includes the following steps.

At S110, if the text information to be displayed and a text display parameter are obtained, the electronic device obtains a video image for displaying the text information to be displayed.

In the live stream scenario, when the audience of the live stream or the host wants to interact through some texts, they can enter the text information to be displayed and the text display parameter in the text interaction window of the live stream client. Or, when users watching variety shows or film and TV series such as short videos, long videos, and the like, they hope to interact with the plot content and can also enter the text information to be displayed and the parameter for text display in the text interaction window of the video client interface.

The text information to be displayed is the text object to be rendered with an effect. The text display parameter is personalized settings for the rules for rendering effects on the displayed text, such as the number of words, text font, text size, color, spacing between multiple texts, and text lifespan (duration of effects display), etc. For example, the text lifespan refers to the time from appearance to disappearance of a character in text effects, which determines the speed of text movement.

When the live stream or video application client receives text information to be displayed and the text display parameter, it indicates that the client needs to perform text effect rendering. The client will obtain a video image to display the text information to be displayed, including the live stream screen being streamed or the video image being played. The video image is a continuous video image of each frame within the duration corresponding to the lifespan of the text to be displayed. Next, image processing will be performed frame by frame to determine the location information of the text to be displayed in each frame of the video image.

At S120, the electronic device identifies key location points of a target object in the video image and determine a display path of the text to be displayed based on the key location points.

The target object can be a person, animal, or other object in the video image. The key location points of the target object are key location points on the target object and corresponding to the morphological features of the target object, and the feature points of the target object. For example, the connection points of different joints or parts of the target object. When the target object is a human or animal, the feature points can be the facial features of the human or animal. When identifying the content of the video image, information comparison or artificial intelligence image recognition methods can be used to identify the target object in the video image. When the video image contains a plurality of target objects, a certain type of object can be preset as the target object, and the determined target object can be selected from the identified multiple target objects. For example, in the live stream scene, the person is set as the target object by default. Alternatively, when the user inputs text information to be displayed, a target object is specified, and then only the target object specified by the user is identified in the video image during video image recognition. If it is identified, the image processing operation will continue: if the target object specified by the user fails to be identified in the video image, the text effect rendering operation process will be stopped. After identifying the target object, the key location points of the target object are identified, thereby obtaining the information of the key location points, that is, the coordinate information of the key location points on the client display screen.

For example, due to the need for curve fitting to determine the display path of the text to be displayed based on some key location points, in order to ensure the accuracy of the curve fitting results, there will be certain requirements for the number of key location points, at least including all essential key location points. Essential key location points are the key location points that have a greater impact on the fitting results during curve fitting.

When the key location points include all essential key location points, the contour expansion key points corresponding to the key location points can be determined based on the location information of the key location points and the predetermined contour expansion parameters: thereby performing a contour curve fitting based on the contour expansion key points and determining the fitted target contour expansion curve as the final text display path. For example, when determining the contour expansion key points corresponding to the key location points based on the location information of the key location points and the predetermined contour expansion parameters, the contour key points corresponding to the key location points on the contour line of the target object can be determined first: then, a contour expansion distance determined based on the predetermined contour expansion parameter is superposed on the basis of location information of the contour key point, to obtain location information of the contour expansion key points. Finally, the suitable curve type can be matched for fitting based on the contour expansion key points, and the target contour expansion curve can be obtained as the display path of the text to be displayed when displaying text effects.

Figure 2:
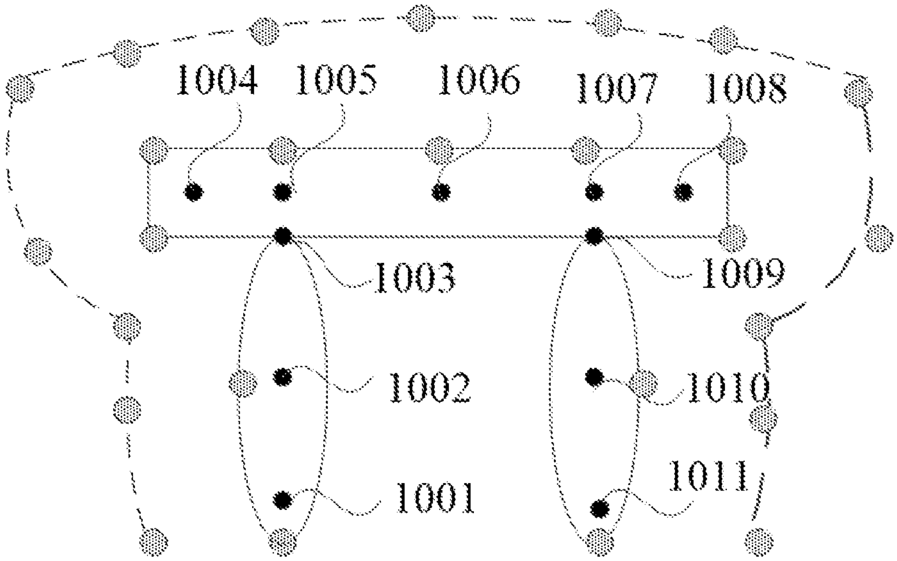
FIG. 2 is a schematic diagram of a target object and a plurality of location points provided by one embodiment of the present disclosure.

As an example. FIG. 2 is a target object identified in a video image, which is a table. The solid line rectangle represents the table top, and the two ellipses represent the table legs. The black dots in the solid line area, marked from 1001-1011, represent all essential key location points of the target object. The dots filled with small black dots on the solid line are the contour key points on the contour line of the target object corresponding to the key location points (essential key location points). While the dots filled with small black dots on the dotted line are the contour expansion key points, and the dotted line is the fitting curve obtained by curve fitting according to the contour expansion key points.

The contour key points are based on the locational relationship of the key location points, and the contour key points of the target object are determined based on the aspect ratio of the predetermined table model and the distance ratio between the key location points and the edge of the table contour. Then, the contour expansion length in the specified direction is superposed on the location of the contour key points, and the contour expansion key points can be determined. In this embodiment, the contour expansion length in the specified direction can be obtained by multiplying the predetermined contour expansion length by the vector cross-product between the contour tangent direction vector and the vector vertically facing the screen, and the target result is obtained. The predetermined contour expansion length represents the distance between the expansion contour line and the contour line. For example, the mapping relationship between the key location points and expansion parameters of the target object, and the target object model can also be established, to directly generate the corresponding contour key points.

At S130, the electronic device displays, based on the text display parameter, the text information to be displayed dynamically according to the display path.

After determining the display path value of the text to be displayed, the text to be displayed is displayed based on the parameters such as text font, text size, color, interval between multiple texts, and text life cycle (effects display duration) required by the text display parameters. In the process of switching a plurality of consecutive frames of video images, the effect of displaying text effects is to move along the display path until the end of the text life cycle. The moving speed of the text can also be determined based on the length of the display path and the length of the text life cycle. The present embodiment can be applied to personalized settings and displays of text effects in video subtitles or bullet screen comments.

In the technical solution of the embodiment of the present disclosure, when a user issues a text effect display instruction, the text information to be displayed and the text display parameter are obtained, then video image displaying the text information to be displayed can be obtained; and the key location points of the target object in the video image are identified, when the identified key location points contain all essential key location points, the display path of the text to be displayed is determined: finally, based on the text display parameter, the text information to be displayed is dynamically displayed based on the display path, which forms a text effect in which the text to be displayed is dynamically displayed around the contour of the target object. The technical solution of the present disclosure avoids the situation where the text effect in the video screen cannot be personalized, and realizes an editable text effect display method, so that the user can personalize the display effect of the text effect when sending text interactive information, increasing the interest of the text effect display.

A plurality of example schemes in the method of displaying a text effect provided by embodiments of the present disclosure and the above embodiments may be combined. The method of displaying a text effect provided by the present embodiment describes the process of supplementing the key location points.

Figure 3:
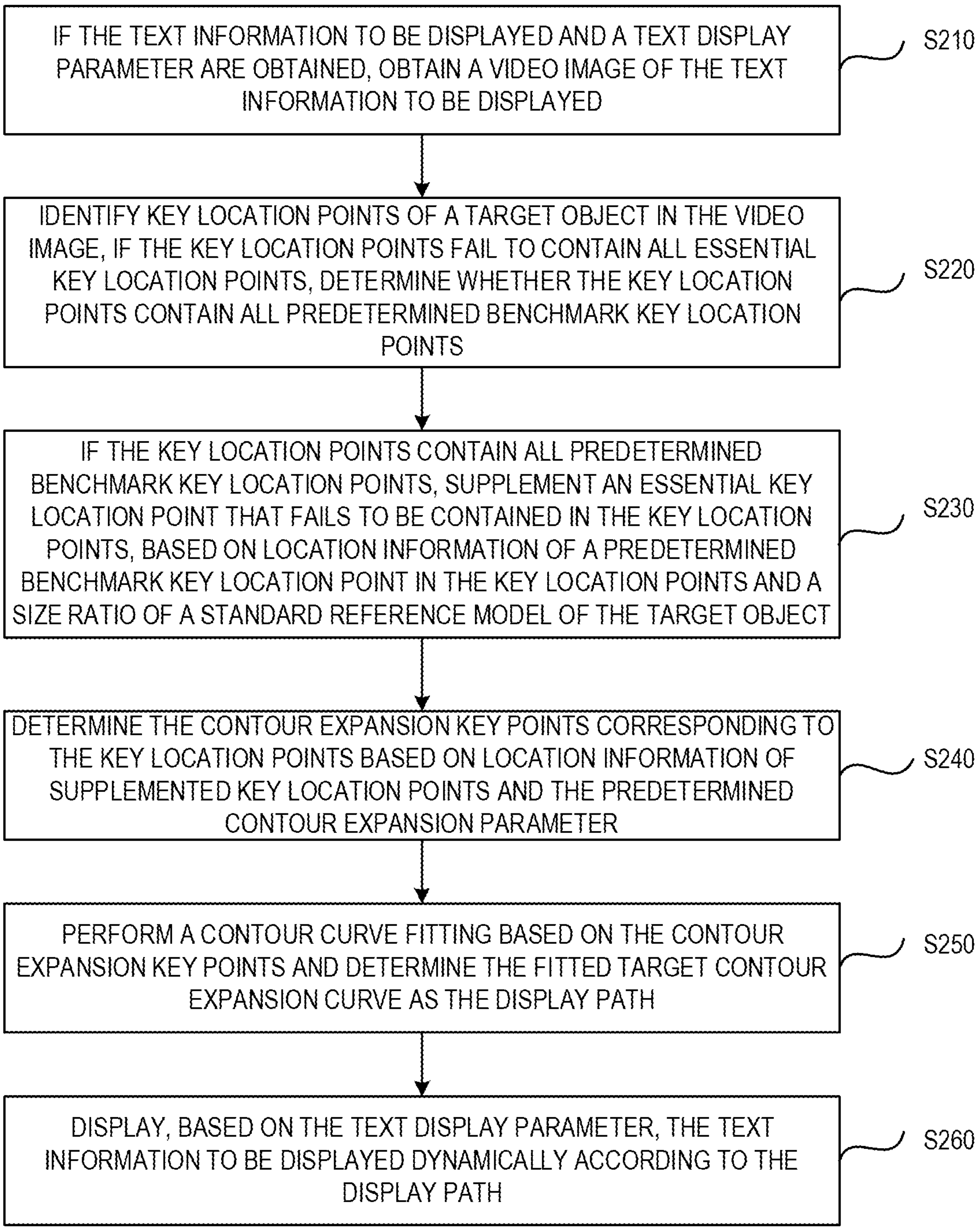
FIG. 3 is a schematic flow diagram of a method of displaying a text effect provided by another embodiment of the present disclosure.

FIG. 3 is a schematic flow diagram of a method of displaying a text effect provided by another embodiment of the present disclosure. As shown in FIG. 3, the method of displaying a text effect provided by the present embodiment includes the following steps.

At S210, if the text information to be displayed and a text display parameter are obtained, the electronic device obtains a video image of the text information to be displayed.

In the live stream scenario, when the audience of the live stream or the host wants to interact through some texts, they can enter the text information to be displayed and the text display parameter in the text interaction window of the live stream client. Or, when users watching variety shows or film and TV series such as short videos, long videos and the like, they hope to interact with the plot content and also can enter the text information to be displayed and the parameter for text display in the text interaction window of the video client interface.

The text information to be displayed is the text object to be rendered with an effect. The text display parameter is personalized settings for the rules for rendering effects on the displayed text, such as the number of words, text font, text size, color, spacing between multiple texts, and text lifespan (duration of effects display), etc. For example, the text lifespan refers to the time from appearance to disappearance of a character in text effects, which determines the speed of text movement.

When the live stream or video application client receives text information to be displayed and the text display parameter, it indicates that the client needs to perform text effect rendering. The client will obtain a video image to display the text information to be displayed, including the live stream screen being streamed or the video image being played. The video image is a continuous video image of each frame within the duration corresponding to the lifespan of the text to be displayed. Next, image processing will be performed frame by frame to determine the location information of the text to be displayed in each frame of the video image.

At S220, the electronic device identifies key location points of a target object in the video image, if the key location points fail to contain all essential key location points, the electronic device determines whether the key location points contain all predetermined benchmark key location points.

In order to ensure the accuracy of curve fitting results, the integrity of key location points will be checked to examine whether the identified key location points contain all essential key location points. Essential key location points are the key location points that have a significant impact on the fitting results during curve fitting. If the key location points fail to contain all essential key location points, it is necessary to determine whether the unidentified essential key location points can be supplemented. If not, the text effect processing process needs to be stopped.

The key point to determine whether unidentified essential key location points can be supplemented is whether all predetermined benchmark key location points are included in the identified key location points. The predetermined benchmark key location points are part of the essential key location points and can be referred to as non-benchmark key location points for setting.

For example, in order to reduce the jitter of text effects caused by video or image algorithms, anti-shake processing is performed on the identified key location points before determining the contour expansion key points corresponding to the key location points. Median filtering or mean filtering and the like can be used for anti-shake operation. Taking median filtering as an example, the median of the location information of key location points in a continuous number (such as three frames) of video images can be taken as the location information of key location points in the current video image to filter out noise jitter.

At S230, if the key location points contain all predetermined benchmark key location points, the electronic device supplements an essential key location point that fails to be contained in the key location points, based on location information of a predetermined benchmark key location point in the key location points and a size ratio of a standard reference model of the target object.

As an example, in FIG. 2, when identifying the target object, all predetermined benchmark key points 1001, 1003, 1004, 1008, 1009, and 1011 are identified. Therefore, the essential key location points can be filled in.

For example, a coordinate system can be established based on the points on the same horizontal line and the points on the same vertical line in the benchmark key points, and the coordinates of multiple benchmark key points in the coordinate system and the distance between multiple benchmark key points can be determined. Then, refer to the locational relationship between multiple essential key location points in the predetermined model of the target object to fill in the missing essential key location points.

At S240, the electronic device determines the contour expansion key points corresponding to the key location points based on location information of supplemented key location points and the predetermined contour expansion parameter.

For example, when determining the contour expansion key points corresponding to the key location points based on the location information of the supplemented key location points and the predetermined contour expansion parameter, the contour key points on the contour line of the target object corresponding to the key location points can be determined firstly based on the predetermined model scale of the target object: then, the contour expansion distance determined based on the predetermined contour expansion parameters is superposed on the basis of location information of the contour key points, to obtain the location information of the contour expansion key points. Finally, suitable curve types can be matched for fitting based on the contour expansion key points, and the target contour expansion curve can be obtained as the display path of the text to be displayed when displaying text effects.

At S250, the electronic device performs a contour curve fitting based on the contour expansion key points and determine the fitted target contour expansion curve as the display path.

In order to ensure that the fitting curve is smooth at the first contour expansion key point at the beginning and the last contour expansion key point at the end, a contour expansion key point should be respectively added to both ends of the fitting curve. This requires a certain linear relationship between the added contour expansion key point and its adjacent two contour expansion key points, that is, keeping the added contour expansion key point and its adjacent two contour expansion key points on the same straight line. The correlation coefficient of the linear relationship can be set based on the characteristics of the fitting curve or set by random numbers. Then, based on the supplemented contour expansion key points, the contour curve is fitted to obtain the target contour expansion curve as the display path.

At S260, the electronic device displays, based on the text display parameter, the text information to be displayed dynamically according to the display path.

In the technical solution embodiments of the present disclosure, on the basis of the above embodiments, when a user issues a text effect display instruction, the text information to be displayed and the text display parameter are obtained, then video image displaying the text information to be displayed can be obtained; and the key location points of the target object in the video image are identified, if the identified key location points fail to contain all the essential key location points, whether the identified key location points contain all predetermined benchmark key location points is determined, if the identified key location points contain all predetermined benchmark key location points, the essential key location points that are not identified are filled based on all preset benchmark key points. Then, based on the key location points after filling, the display path of the text to be displayed is determined: finally, based on the text display parameters, the text information to be displayed is dynamically displayed based on the display path, which forms a text effect in which the text to be displayed is dynamically displayed around the contour of the target object. The technical solution of the embodiments of the present disclosure avoids the situation where the text effects in the video screen cannot be personalized, and the problem that the essential key location points are missing during the text effects processing and realizes a way to display the effect of editable texts. When a user sends text interactive information, the user can personalize the display effect of the text effects, and the interest of displaying the text effects is increased. Even under the condition of incomplete identification of key location points, text effects processing can still be performed.

A plurality of example schemes in the method of displaying a text effect provided by embodiments of the present disclosure and the above embodiments may be combined. The method of displaying a text effect provided by the present embodiment describes the process of displaying the text based on the display path.

Figure 4:
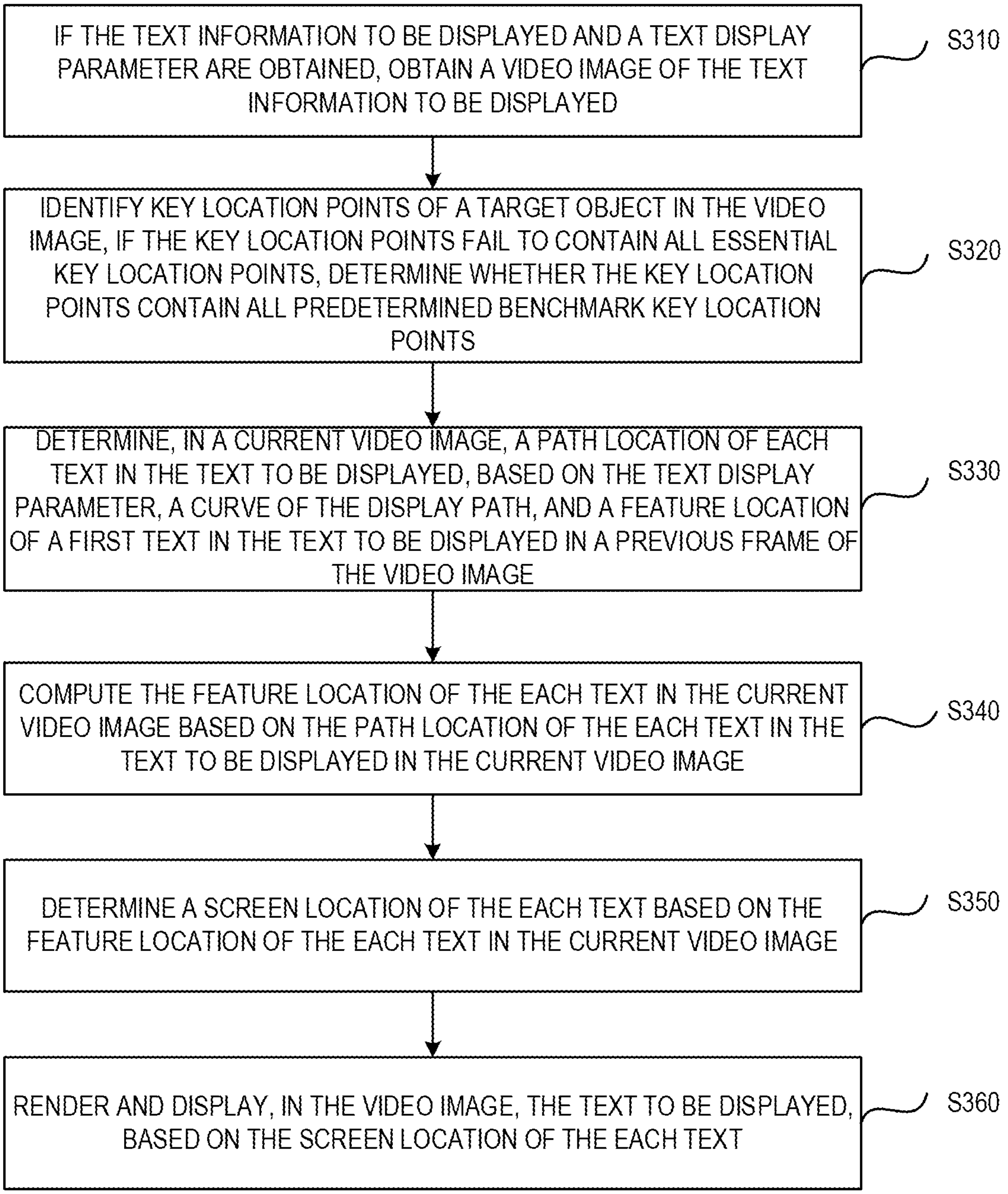
FIG. 4 is a schematic flow diagram of a method of displaying a text effect provided by another embodiment of the present disclosure.

FIG. 4 is a schematic flow diagram of a method of displaying a text effect provided by another embodiment of the present disclosure. As shown in FIG. 4, the method of displaying a text effect provided by the present embodiment includes the following steps.

At S310, if the text information to be displayed and a text display parameter are obtained, the electronic device obtains a video image of the text information to be displayed.

At S320, the electronic device identifies key location points of a target object in the video image, if the key location points fail to contain all essential key location points, the electronic device determines whether the key location points contain all predetermined benchmark key location points.

The specific content of S310-S320 can be referred to the foregoing embodiments and are not elaborated in the present embodiment.

At S330, the electronic device determines, in a current video image, a path location of each text in the text to be displayed, based on the text display parameter, a curve of the display path, and a feature location of a first text in the text to be displayed in a previous frame of the video image.

Due to the fact that the target object may move in different frames of video images, for example, in consecutive video image frames, the target object is getting closer to the lens, the target object will become larger, and the curve of the display path will also become longer. Therefore, the movement process of the text to be displayed on the display path is uneven. In order to make the dynamic movement process of the text more stable and uniform during the display of text effects, the location information of text feature can be transmitted in adjacent two frames of video images. Since the target object in the video will constantly change, the text location in the human eye is generally set with reference to a certain feature point. The location of feature point can maintain visual locational invariance in the current video image compared to the location in the previous frame of video image. Therefore, the concept of the feature location is introduced here. The feature location represents the location of each text on the curve segment between two contour expansion key points on the display path. The path location represents the curve path length of each text moving on the display path. The feature location of the text on the screen can be represented by CN (n, t) indicating that the location of the $N^{th}$ text is located on the curve segment of the contour expansion key point P (n) and the contour expansion key point P (n+1), t is the parameter for displaying the path curve and the value range of t is 0-1, indicating the degree to which the location of the $N^{th}$ text is close to the contour expansion key point P (n) or the contour expansion key point P (n+1). The path location represents the length of the curve path that the $N^{th}$ text travels from the starting point P1 in the contour expansion key points, which can be represented by LN. The introduction of the path location is to ensure the visual speed invariance of the text movement. In addition, the curve length corresponding to the $N^{th}$ text moving from the feature location CN (n, 0) to CN (n, t) can be represented by LN (n, t): the curve length of Pn-m is represented by L (n, m), that is the curve length between the contour expansion key point n and the contour expansion key point m: L (n, n+1) is represented by L (n), that is the curve length between the contour expansion key point n and the contour expansion key point n+1.

For example, the process of displaying each text in texts in the path location of the current video image is as follows:

- firstly, in the current video image, the moving speed of the text to be displayed is determined based on the life cycle of the text in the text display parameter and the curve length of the display path. The curve length is the length from the first contour expansion key point to the last contour expansion key point. The speed of the text can be determined by dividing the curve length by the life cycle of the text.

Then, the feature location of the first text in the text to be displayed in the previous frame of video image is obtained. If the previous frame is non-empty, the feature location can be obtained directly. If the current video image is the first frame of video image and the previous frame is empty, the feature location of the first text in the text to be displayed in the previous frame of video image is recorded as CN (1, 0), indicating that the first text is at the location of the first contour expansion key point, which is equivalent to the starting point of dynamic display of text effects. Therefore, based on the feature location of first text in the text to be displayed in the previous frame of video image, the path location of the first text can be computed. For example, the predetermined curve integration algorithm can be used to integrate the fitting curve of the display path based on the feature location of the first text in the previous frame of video image, to determine the corresponding initial path location of the first text in the current video image. The predetermined curve integration algorithm can be the Gauss-Legendre integration algorithm, which is a commonly used algorithm for integral solution in computers. The advantage is that it obtains a highly accurate and numerically stable integration computation result with relatively few evaluation computations. Then, the moving distance of the first text is determined based on the time interval between the current video image and the previous frame of video image and the moving speed of the text to be displayed: further, the moving distance is superposed on the basis of the initial path location of the first text in the previous frame video image to obtain the path location of the first text to be displayed in the current video image.

For example, the display interval between each text in the text to be displayed and the first text can be superposed on the basis of the path location of the first text in the current video image to determine the path location of each text in the text to be displayed in the current video image.

At S340, the electronic device computes the feature location of the each text in the current video image based on the path location of the each text in the text to be displayed in the current video image.

The feature location is equivalent to a point on the display path curve, so the corresponding feature location point of path location of each text in the current video image can be determined by solving the curve. As an example, the Newton iteration algorithm can be used to compute the feature location of each text. The Newton iteration method is a commonly used method for finding approximate roots of equations, which has the advantages of reasonable computational and solution accuracy meeting requirements compared to finding exact roots.

In the process of solving with the Newton iteration algorithm, the number of Newton iteration is usually set to 3. Firstly, based on the path location of each text in the current video image, determine the path location is within the display path curve of which two contour expansion key points. Then, the parameters of the display path curve are input to the Newton iteration function to iteratively solve based on the predetermined number of Newton iteration, and finally the feature location of each text in the current video image is obtained.

At S350, the electronic device determines a screen location of the each text based on the feature location of the each text in the current video image.

In the process of contour expansion curve fitting, the curve fitting is performed based on the screen location of each contour expansion key point, and the output of the fitting curve is the screen location. For the feature location CN (n, t) of the $N^{th}$ text, t, the location information of the contour expansion key point P (n) and one or more adjacent contour expansion key points are input to the display path curve to obtain the screen location of the $N^{th}$ text. The location information of the contour expansion key point P (n) and one or more adjacent contour expansion key points specifically input to the display path curve is consistent with the conditions of fitting the display path curve. For example, when performing curve fitting, four adjacent contour expansion key points are used for spline curve fitting, and thus the location information input to the display path curve is the location information of the four contour expansion key points P (n−1), P (n), P (n+1), and P (n+2) when determining the screen location.

At S360, the electronic device renders and displays, in the video image, the text to be displayed, based on the screen location of the each 12 text.

In this step, the text to be displayed can be rendered at the screen location of each text based on the text font and text size in the text display parameters: then, the rendering effect of each text is superposed on the corresponding video image for display. The video image is rendered before the text is rendered.

In the technical solution of embodiments of the present disclosure, based on the above embodiments, the feature location and path location of text in the video image are introduced. When determining the movement process of the text to be displayed, the path location of each text in the current video image is determined based on the feature location of each text in the previous frame of the video image, and the path location is converted into the feature location in the current video image, and the screen location of each text is determined. The situation where the dynamic effect of text rendering changes unevenly due to changes in the target object in different frames of video images can be avoided and the rendering effect of the text to be displayed can be optimized. Finally, a dynamic display text effect in which the text to be displayed that moves at a constant speed around the contour of the target object is formed. The technical solution of the embodiments of the present disclosure avoids the situation where the text effect in the video screen cannot be personalized and the problem that the target object in different video frames changes and realizes a way to display the effect of editable texts. When a user sends text interactive information, the user can personalize the display effect of the text effects, and the interest of displaying the text effects is increased.

A plurality of example schemes in the method of displaying a text effect provided by embodiments of the present disclosure and the above embodiments may be combined. The method of displaying a text effect provided by the present embodiment describes the process of causing the text to display based on the contour curve path of a portrait if the target object is the portrait.

Figure 5:
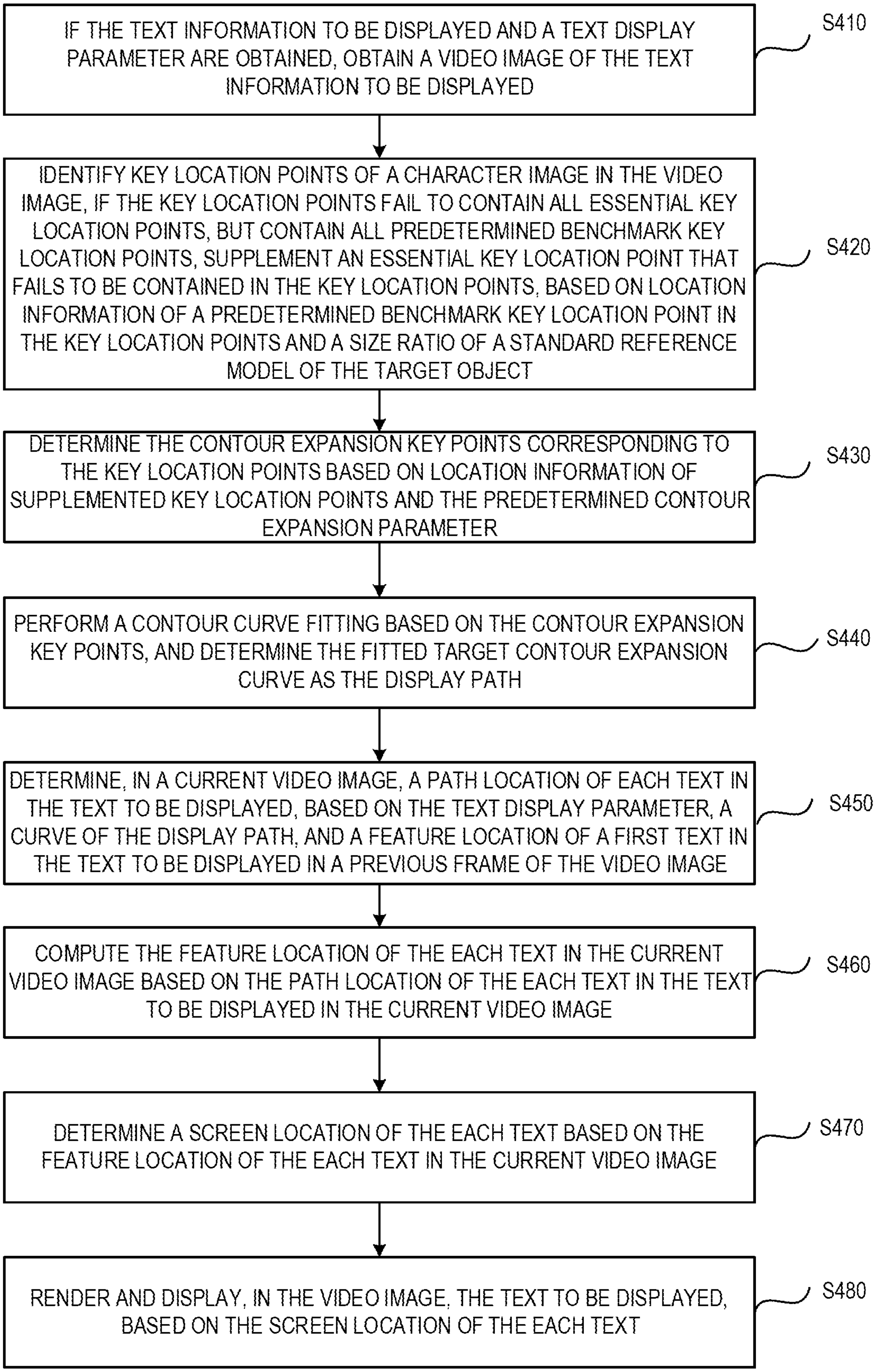
FIG. 5 is a schematic flow diagram of a method of displaying a text effect provided by another embodiment of the present disclosure.

FIG. 5 is a schematic flow diagram of a method of displaying a text effect provided by another embodiment of the present disclosure. As shown in FIG. 5, the method of displaying a text effect provided by the present embodiment will be discussed as below.

At S410, if the text information to be displayed and a text display parameter are obtained, the electronic device obtains a video image of the text information to be displayed.

At S420, the electronic device identifies key location points of a character image in the video image, if the key location points fail to contain all essential key location points, but contain all predetermined benchmark key location points, supplement an essential key location point that fails to be contained in the key location points, based on location information of a predetermined benchmark key location point in the key location points and a size ratio of a standard reference model of the target object.

In the present embodiment, the target object is a character image, by the technical solution of the present embodiment, the process of dynamically displaying text over the human body contour can be realized, which can be applied to user interaction in the live stream scene, or other video interaction scenes.

Figure 6:
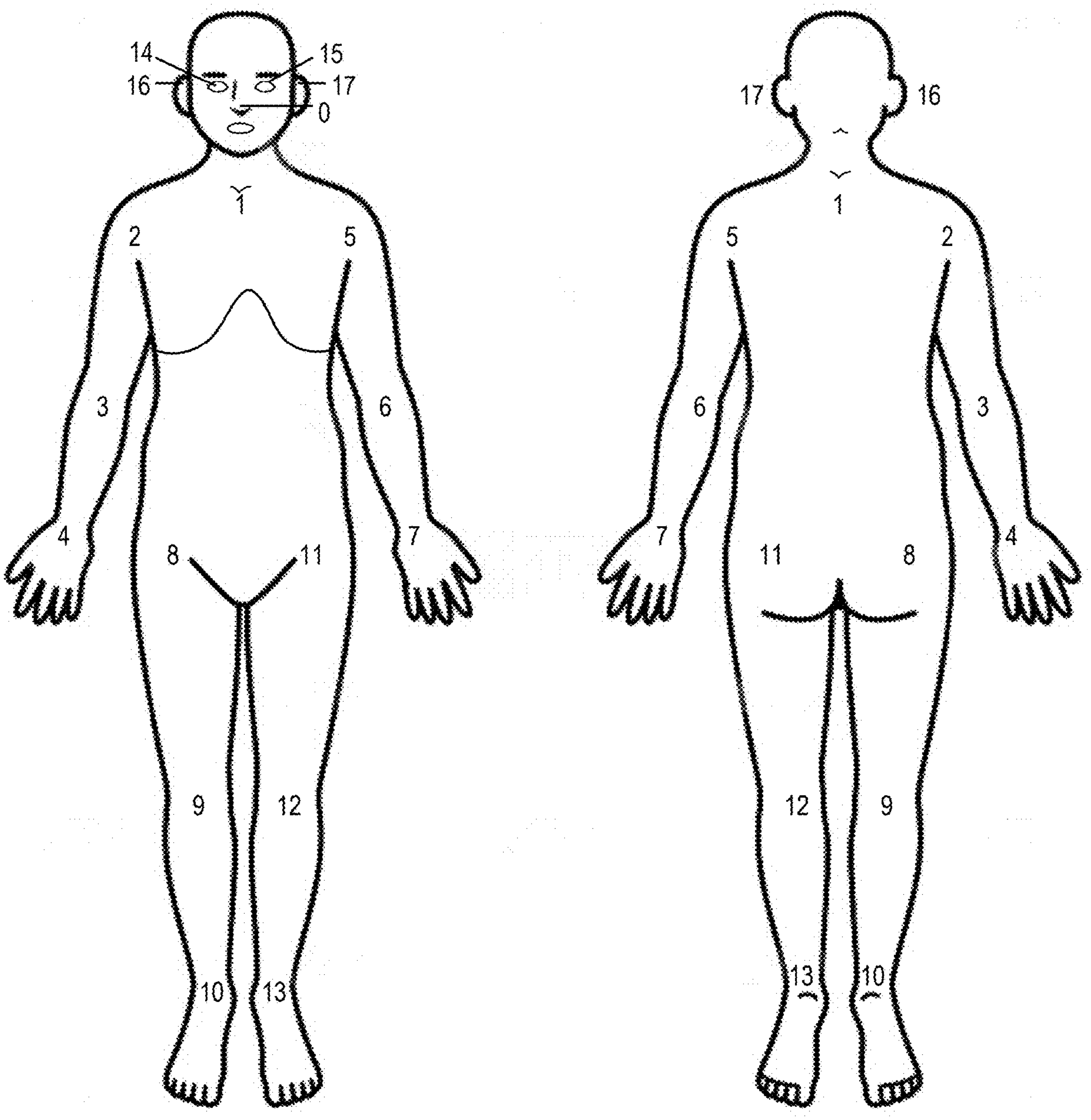
FIG. 6 is a schematic diagram of the overall essential key location points of a standard portrait model provided by one embodiment of the present disclosure.

When identifying the key location points of the character image, reference is made to the predetermined human skeleton key point model, and the locations of multiple key points in the model can be shown in FIG. 6. FIG. 6 shows a two-dimensional human skeleton key point model, including 0-17 key points in the model. Certainly, a three-dimensional human skeleton key points model can also be used. The reason why a two-dimensional human skeleton key point model is used in this embodiment instead of a three-dimensional human skeleton key point model is that the accuracy and stability of the three-dimensional human skeleton key point model are not as good as those of the two-dimensional human skeleton key point model, and the two-dimensional human skeleton key point model has met the requirements of special effects.

Figure 7:
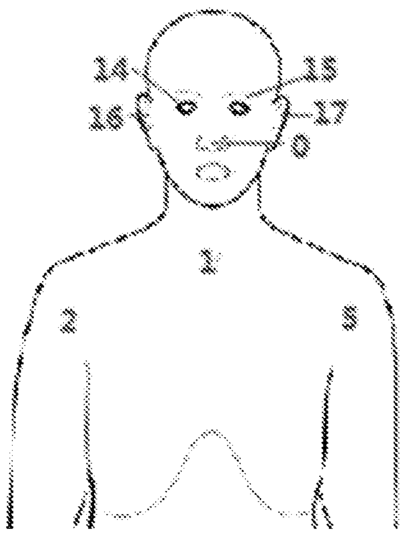
FIG. 7 is a schematic diagram of essential key location points of the upper body of a human body image provided by one embodiment of the present disclosure.

Taking the key location points of the upper body of the human skeleton key point model (as shown in FIG. 7) as an example, the process of determining all essential key location points of a character image is illustrated. In the upper body part of the human body, a set of essential key location points is: [0, 1, 2, 5, 14, 15, 16, 17]. Since some of the characters in the video image are sometimes outside the video image, the essential key location points identified by the image algorithm are incomplete, it is necessary to check whether the obtained essential key location points are lost, and if lost, they need to be filled according to the predetermined strategy. For example, select some predetermined benchmark key location points near the middle of the face, and compute the default location of other essential key location points based on the proportion of standard portraits. For example, the predetermined benchmark key location points in this embodiment are [0, 1, 14, 15], 0 is taken as the coordinate origin, 0-1 is taken as the direction of the vertical axis, and 14-15 is taken as the direction of the horizontal axis to establish a reference coordinate system. The specific computation formula of the $a^{th}$ key point is as follows (The value range of a is the sequence number of the essential key position points in the set of essential key position points):

$$B(a)=B(0)+x(a)*[B(15)-B(14)]+y(a)*[B(1)-B(0)].$$

B (a) represents the screen location of the $a^{th}$ human key point, that is, the location information obtained when identifying the key point, x (a) and y (a) are the horizontal and vertical coordinates of point a in the reference coordinate system respectively, x (a) and y (a) can be computed based on the location information of the known key points and the proportion of the human skeleton key point model in advance. The coordinate computation results of the essential key location points to be supplemented in the reference coordinate system are shown in the table below:

| a | x(a) | y(a) |
|---|---|---|
| 2 | −2.0 | 1.5 |
| 5 | 2.0 | 1.5 |
| 16 | −0.9 | −0.3 |
| 17 | 0.9 | −0.3 |

For example, by incorporating the coordinate values in the preceding table into the formula for computing the screen location of key points, the screen location information of supplemented essential key location points can be determined.

For example, in order to reduce the jitter of text effects caused by video or image algorithms, anti-shake processing is performed on identified key location points. Simple median filtering can be used, and the median of the location components of three consecutive frames of key points is taken as the location component of the current frame to filter out noise jitter. Alternatively, other filtering methods can be used.

At S430, the electronic device determines the contour expansion key points corresponding to the key location points based on location information of supplemented key location points and the predetermined contour expansion parameter.

Figure 8:
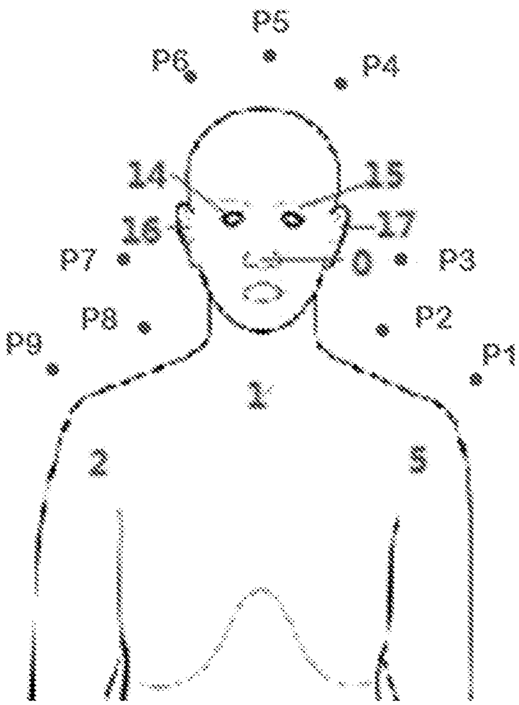
FIG. 8 is a schematic diagram of contour expansion key points provided by one embodiment of the present disclosure.

Several key location points corresponding to the essential key location points are generally selected as contour expansion key points, which are usually location points that reflect the overall contour and features of the character image. The selection of contour expansion key points for the character image can refer to the contour expansion key points P1-P9 shown in FIG. 8. The location computation of each round of expansion key points depends on the contour key points on the contour line of the human body image. Here, the location computation of the $n^{th}$ outer contour key point can be computed with the following formula: P(n)=O(a)+length*cross(T(n), forward).

P (n) is the location information of the $n^{th}$ contour expansion key point, that is, the screen coordinate location: O (a) is the location information of each essential key location point on the human body contour line, and the specific value can be determined based on the location information of the essential key location points, the distance between the essential key location points and the proportion of the standard portrait, or the computation rules can be set in advance based on the characteristics of the portrait, and the computation rules can meet the visual effect that matches the human body contour, and simple computation rules are preferred: length is the length of contour expansion, which represents the distance between the contour expansion curve and the human body, cross ( ) is the vector cross multiplication function, T (n) is the tangential direction of the contour line, and forward is the vector vertically facing the screen, which is (0,0,1). The values of O (a) and T (n) determine the shape of the contour expansion curve, and length determines the contour size. In this embodiment, in order to simplify the computation relationship as much as possible, the numerical computation of O (a) corresponding to each contour key point follows the computation rules in the table below:

| n | O(a) | T(n) | length |
|---|---|---|---|
| 1 | B(5) | B(0) − B(5) | distance[B(2), |
| 2 | B(5) * 0.6 + [B(1) + B(0)] * 0.2 | B(1) − B(5) | B(5)] * 0.1 |
| 3 | B(17) | B(15) − B(0) | |
| 4 | B(15) * 1.7 − B(0) * 0.7 | B(14) − B(17) | |
| 5 | [B(14) + B(15)] * 1.25 − B(0) * 1.5 | B(14) − B(15) | |
| 6 | B(14) * 1.7 − B(0) * 0.7 | B(16) − B(15) | |
| 7 | B(16) | B(0) − B(14) | |
| 8 | B(2) * 0.6 + [B(1) + B(0)] * 0.2 | B(2) − B(1) | |
| 9 | B(2) | B(2) − B(16) | |

where distance ( ) represents the distance between two points.

At S440, the electronic device performs a contour curve fitting based on the contour expansion key points, and determine the fitted target contour expansion curve as the display path.

Figure 9:
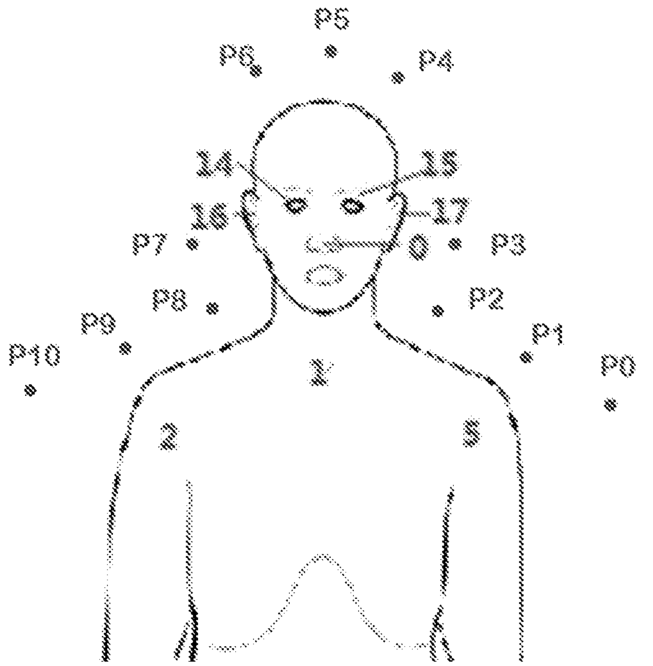
FIG. 9 is a schematic diagram of contour expansion key points after supplement provided by one embodiment of the present disclosure.

Firstly, in order to ensure that the fitting curve is smooth at the starting P1 and the ending point P9, it is necessary to supplement the contour expansion key points at the starting and ending points of the contour expansion key points, such as P0 and P10 in FIG. 9. P0 and P10 need to conform to a certain linear relationship with the original contour key points in order to make the fitting curve smooth at the starting P1 and the ending point P9, that is, to keep P2-3-0 and P8-9-10 on the same line. In this embodiment, the specific computation relationship between P0 and P10 can be computed as follows:

$$P(0) = P(1) * 2 - P(2),$$

$$P(10) = P(9) * 2 - P(8).$$

The determination of the above computation relationship can set multiple sets of linear relationship parameters in advance, to obtain multiple sets of linear fitting results respectively, and the final computation relationship is determined based on the effect of curve fitting. For example, in this embodiment, after determining the final supplemented contour expansion key points, a CatmullRom spline curve is used for linear fitting. For the curve segment P(n)–P(n+1) between any two contour expansion key points, four points, that is, P (n−1), P (n), P (n+1), and P (n+2) are required as input. The computation code is as follows, where p0, p1, p2, and p3 correspond to the 4 input points respectively, and t ranges from 0-1, a, b, and c are known curve fitting parameters, so the return value is the screen location.

```
function CatmullRomPoint(t, p0, p1, p2, p3)
  local a = p1
  local b = (p2 − p0) * 0.5
  local c = (p0 * 2 − p1 * 5 + p2 * 4 − p3) * 0.5
  local d = (−p0 + p1 * 3 − p2 * 3 + p3) * 0.5
  return a + b * t + c * t * t + d * t * t * t
end
```

Figure 10:
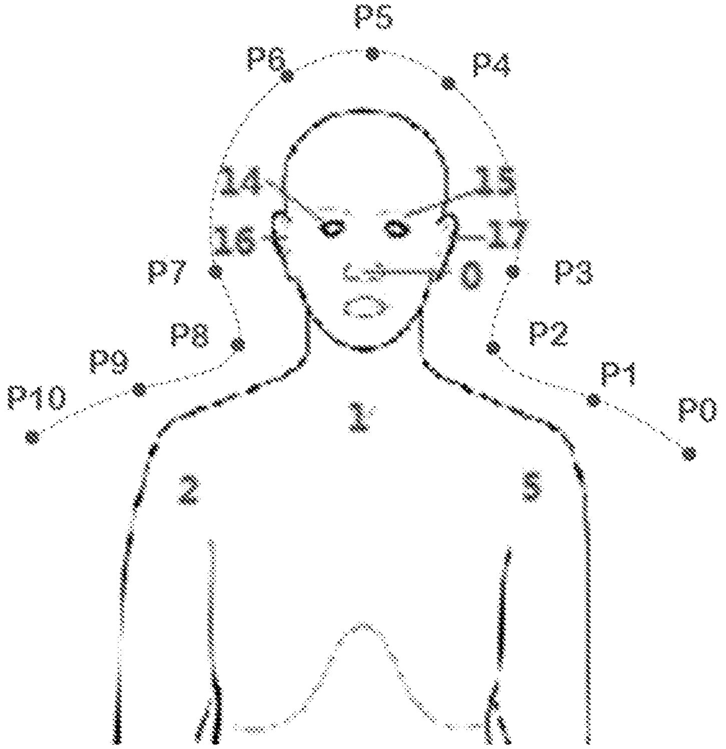
FIG. 10 is a schematic diagram of a fitting curve of a display path provided by one embodiment of the present disclosure.

The final fitting curve is shown by the dashed line in FIG. 10, where the curve segments P1-P9 are dynamic display paths of the text to be displayed.

At S450, the electronic device determines, in a current video image, a path location of each text in the text to be displayed, based on the text display parameter, a curve of the display path, and a feature location of a first text in the text to be displayed in a previous frame of the video image.

Due to the fact that the target object may move in different frames of video images, for example, in consecutive video image frames, the target object is getting closer to the lens, the target object will become larger, and the curve of the display path will also become longer. Therefore, the movement process of the text to be displayed on the display path is uneven. In order to make the dynamic movement process of the text more stable and uniform during the display of text effects, the location information of text feature can be transmitted in adjacent two frames of video images. Since the target object in the video will constantly change, the text location in the human eye is generally set with reference to a certain feature point. The location of feature point can maintain visual locational invariance in the current video image compared to the location in the previous frame of video image. Therefore, the concept of a feature location is introduced here. The feature location represents the location of each text on the curve segment between two contour expansion key points on the display path. The path location represents the curve path length of each text moving on the display path. The feature location of the text on the screen can be represented by CN (n, t) indicating that the location of the $N^{th}$ text is located on the curve segment of the contour expansion key point P (n) and the contour expansion key point P (n+1), t is the parameter for displaying the path curve and the value range of t is 0-1, indicating the degree to which the location of the $N^{th}$ text is close to the contour expansion key point P (n) or the contour expansion key point P (n+1). The path location represents the length of the curve path that the $N^{th}$ text travels from the starting point P1 in the contour expansion key points, which can be represented by LN. The introduction of the path location is to ensure the visual speed invariance of the text movement. In addition, the curve length corresponding to the $N^{th}$ text moving from the feature location CN (n, 0) to CN (n, t) can be represented by LN (n, t): the curve length of Pn-m is represented by L (n, m), that is the curve length between the contour expansion key point n and the contour expansion key point m: L (n, n+1) is represented by L (n), that is the curve length between the contour expansion key point n and the contour expansion key point n+1.

For example, the process of displaying each text in texts in the path location of the current video image is as follows:

firstly, in the current video image, the moving speed of the text to be displayed is determined based on the life cycle of the text in the text display parameter and the curve length of the display path. The curve length is the length from the first contour expansion key point to the last contour expansion key point. The speed of the text can be determined by dividing the curve length by the life cycle of the text.

Then, the feature location of the first text in the text to be displayed in the previous frame of video image is obtained. If the previous frame is non-empty, the feature location can be obtained directly. If the current video image is the first frame of video image and the previous frame is empty, the feature location of the first text in the text to be displayed in the previous frame of video image is recorded as CN (1, 0), indicating that the first text is at the location of the first contour expansion key point, which is equivalent to the starting point of dynamic display of text effects. Therefore, based on the feature location of first text in the text to be displayed in the previous frame of video image, the path location of the first text can be computed. For example, the predetermined curve integration algorithm can be used to integrate the fitting curve of the display path based on the feature location of the first text in the previous frame of video image, to determine the corresponding initial path location of the first text in the current video image.

In the present embodiment, based on the curve fitting function, text feature location points may be represented as Q(n,t)=CatmullRomPoint [t, P(n−1), P(n), P(n+1), P(n+2)]: if it is a polynomial, $Q(n,t)=a+bt+ct^2+dt^3$ can be obtained: the derivative of the polynomial can be represented as: $Q'(n,t)=b+2ct+3dt^2$: the vector length corresponding to the derivative is:

$$\|Q'(n,t)\| = \sqrt{Q_x'(n,t)^2 + Q_y'(n,t)^2};$$

then, the curve length LN (n, t) can be computed based on the Gauss-Legendre integration, $$LN(n,t) \approx \frac{t}{2}\sum_{1}^{k} \omega_i \left\| Q'\left(n, \frac{t}{2}x_i + \frac{t}{2}\right)\right\|,$$

where k=5. The parameters corresponding to the Gauss-Legendre integration can be obtained according to the following table.

| the value of i | the location of the point, $x_i$ | weight, $\omega_i$ |
|---|---|---|
| 1 | 0 | 2 |

-continued

| the value of i | the location of the point, $x_i$ | weight, $\omega_i$ |
|---|---|---|
| 2 | $\pm 1/\sqrt{3}$ | 1 |
| 3 | 0 | 8/9 |
| | $\pm\sqrt{3/5}$ | 5/9 |
| 4 | $\pm\frac{\sqrt{525-70\sqrt{30}}}{35}$ | $\frac{18+\sqrt{30}}{36}$ |
| | $\pm\frac{\sqrt{525+70\sqrt{30}}}{35}$ | $\frac{18-\sqrt{30}}{36}$ |
| 5 | 0 | 128/225 |
| | $\pm\frac{\sqrt{245-14\sqrt{70}}}{21}$ | $\frac{322+13\sqrt{70}}{900}$ |
| | $\pm\frac{\sqrt{245+14\sqrt{70}}}{21}$ | $\frac{322-13\sqrt{70}}{900}$ |

The path location can be represented as $$LN = L(1,n) + LN(n,t) = \sum_{i=1}^{n-1} LN(i,1) + LN(n,t).$$

After computing the path location, the moving distance of the first text is determined based on the time interval between the current video image and the previous frame of video image and the moving speed of the text to be displayed: further, the moving distance is superposed on the basis of the initial path location of the first text in the previous frame video image to obtain the path location of the first text to be displayed in the current video image.

For example, the display interval between each text in the text to be displayed and the first text can be superposed on the basis of the path location of the first text in the current video image to determine the path location of each text in the text to be displayed in the current video image.

At S460, the electronic device computes the feature location of the each text in the current video image based on the path location of the each text in the text to be displayed in the current video image.

The feature location is equivalent to a point on the display path curve, so the corresponding feature location point of path location of each text in the current video image can be determined by solving the curve. As an example, the Newton iteration algorithm can be used to compute the feature location of each text. The Newton iteration method is a commonly used method for finding approximate roots of equations, which has the advantages of reasonable computational and solution accuracy meeting requirements compared to finding exact roots.

Figure 11:
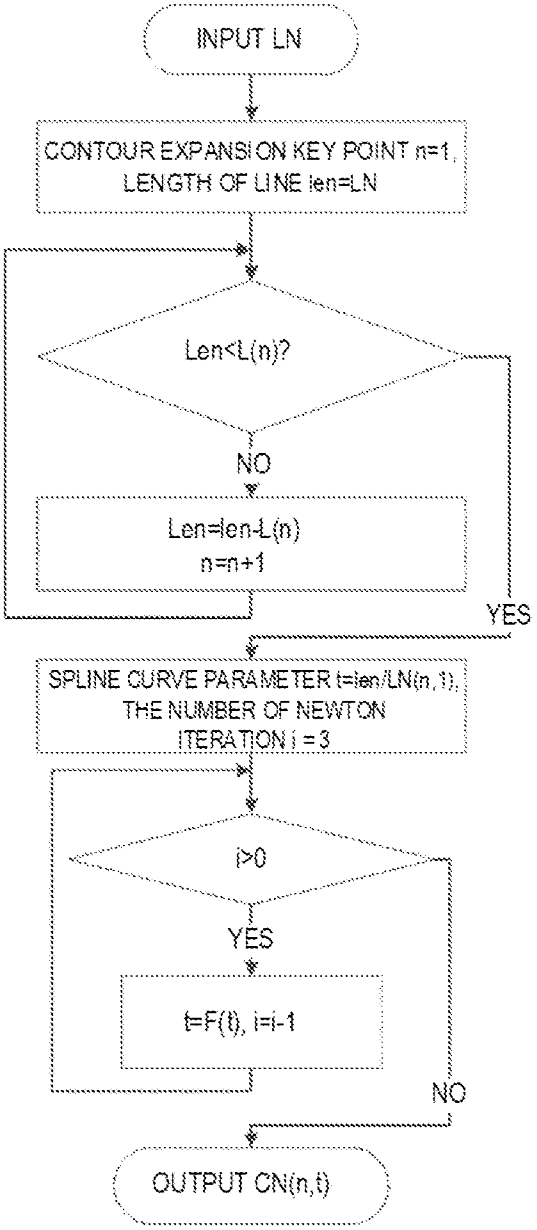
FIG. 11 is a schematic flowchart of using a Newton iterative algorithm to compute a feature location provided by one embodiment of the present disclosure.

In the process of solving with the Newton iteration algorithm, the number of Newton iteration is usually set to 3. Firstly, based on the path location of each text in the current video image, determine the path location is within the display path curve of which two contour expansion key points. Then, the parameters of the display path curve are input to the Newton iteration function to iteratively solve based on the predetermined number of Newton iteration, and finally the feature location of each text in the current video image is obtained. In this embodiment, the process of computing the feature location can refer to the flowchart shown in FIG. 11. The path location of the $N^{th}$ text is assigned to len, and then start from P1 to determine the interval of which two contour expansion key points the $N^{th}$ text falls within. If len is greater than the length between P1 and P2, the value of len is subtracted from the length between P1 and P2. Based on the value of the new len, determine whether the feature location of the $N^{th}$ text is between points P2 and P3, until len is less than L (n), determine the curve segment where the $N^{th}$ text is located, and the Newton iterative algorithm is used to solve the parameter t to determine the feature location of the $N^{th}$ text, where $$F(t) = t - \frac{LN(n, t) - len}{LN'(n, t)}.$$

At S470, the electronic device determines a screen location of the each text based on the feature location of the each text in the current video image.

In the process of contour expansion curve fitting, the curve fitting is performed based on the screen location of each contour expansion key point, and the output of the fitting curve is the screen location. For the feature location CN (n, t) of the $N^{th}$ text, t, the location information of the contour expansion key point P (n) and one or more adjacent contour expansion key points are input to the display path curve to obtain the screen location of the $N^{th}$ text, which can be represented as: N(x,y)=Q(n,t)=CatmullRomPoint [t,P(n−1), P(n), P(n+1), P(n+2)], where SN(x,y) is the screen location of the $N^{th}$ text.

At S480, the electronic device renders and displays, in the video image, the text to be displayed, based on the screen location of the each text.

In this step, the text to be displayed can be rendered at the screen location of each text based on the text font and text size in the text display parameters: then, the rendering effect of each text is superposed on the corresponding video image for display. The video image is rendered before the text is rendered.

In the technical solution of embodiments of the present disclosure, based on the above embodiments, under the case of applying the method of displaying a text effect to the target object which is a human body image, the essential key location points in the video image is identified firstly, and the essential key location points that are not identified are supplemented, and then the fitting of the text display path curve is gradually performed, and then the feature location and path location of the text in the video image are introduced based on the curve fitting result. When determining the movement process of the text to be displayed, the path location of each text in the current video image is determined based on the feature location of each text in the previous frame of the video image, and the path location is converted into the feature location in the current video image, and the screen location of each text is determined. Finally, a dynamic display text effect in which the text to be displayed that moves at a constant speed around the contour of the target object is formed. The technical solution of the embodiments of the present disclosure avoids the situation where the text effect in the video screen cannot be personalized and the problem that the target object in different video frames changes and realizes a way to display the effect of editable texts. When a user sends text interactive information, the user can personalize the display effect of the text effects, and the interest of displaying the text effects is increased.

Figure 12:
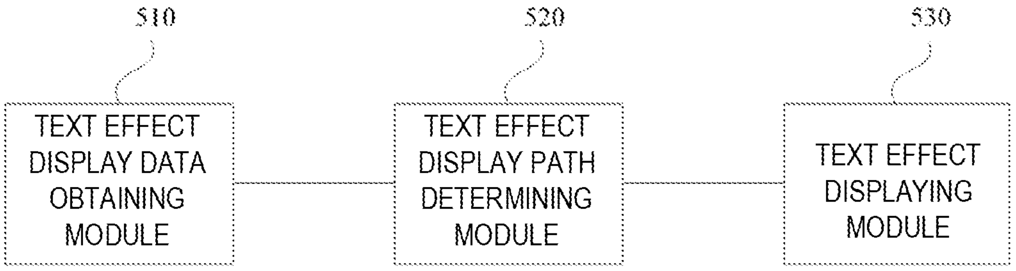
FIG. 12 is a schematic structural diagram of an apparatus for displaying a text effect provided by one embodiment of the present disclosure.

FIG. 12 is a schematic structural diagram of an apparatus for displaying a text effect provided by one embodiment of the present disclosure. The apparatus for displaying a text effect provided by the present embodiment is suitable for displaying a text effect in a video image.

As shown in FIG. 12, the apparatus for displaying a text effect includes: a text effect display data obtaining module 510, a text effect display path determining module 520 and a text effect displaying module 530.

The text effect display data obtaining module 510 is configured for, if text information to be displayed and a text display parameter are obtained, obtaining a video image for displaying the text information to be displayed: the text effect display path determining module 520 is configured for identifying key location points of a target object in the video image, and determining a display path of the text to be displayed based on the key location points: the text effect displaying module 530 is configured for displaying, based on the text display parameter, the text information to be displayed dynamically according to the display path.

In the technical solution of the embodiment of the present disclosure, when a user issues a text effect display instruction, the text information to be displayed and the text display parameter are obtained, then video image displaying the text information to be displayed can be obtained; and the key location points of the target object in the video image are identified, if the identified key location points contain all essential key location points, the display path of the text to be displayed is determined: finally, based on the text display parameter, the text information to be displayed is dynamically displayed based on the display path, which forms a text effect in which the text to be displayed is dynamically displayed around the contour of the target object. The technical solution of the present disclosure avoids the situation where the text effect in the video screen cannot be personalized, and realizes an editable text effect display method, so that the user can personalize the display effect of the text effect when sending text interactive information, increasing the interest of the text effect display.

For example, the text effect display path determining module 520 includes a contour expansion key point determining submodule and a path curve fitting submodule: where, the contour expansion key point determining submodule is configured for, if the key location points comprise all essential key location points, determining contour expansion key points corresponding to the key location points based on location information of the key location points and a predetermined contour expansion parameter: the path curve fitting submodule is configured for performing a contour curve fitting based on the contour expansion key points and determining the fitted target contour expansion curve as the display path.

For example, the text effect display path determining module 520 further includes a key location point supplementing submodule, which is configured for: determining whether the key location points contain all predetermined benchmark key location points: if the key location points contain all predetermined benchmark key location points, supplementing an essential key location point that fails to be contained in the key location points, based on location information of a predetermined benchmark key location point in the key location points and a size ratio of a standard reference model of the target object; and if the key location points fail to contain all the predetermined benchmark key location points, terminating a display processing process of a current text effect.

For example, the contour expansion key point determining submodule is configured for: determining, on a contour line of the target object, a contour key point corresponding to the key location points; and superposing a contour expansion distance determined based on the predetermined contour expansion parameter on the basis of location information of the contour key point, to obtain location information of the contour expansion key points.

For example, the path curve fitting submodule is configured for: supplementing the contour expansion key points based on a predetermined contour expansion key point location relationship; and performing the contour curve fitting based on the supplemented contour expansion key points.

For example, the apparatus for displaying a text effect further includes a key location point information correcting module, which is configured for, before determining the contour expansion key point corresponding to the key location points, taking a median value of location information of the key location points in a plurality of consecutive frames of video images as location information of the key location points.

For example, the text effect displaying module 530 includes: a text path location determining submodule, a text feature location determining submodule, a text screen location determining submodule, and a text rendering and displaying submodule: where the text path location determining submodule is configured for determining, in a current video image, a path location of each text in the text to be displayed, based on the text display parameter, a curve of the display path, and a feature location of a first text in the text to be displayed in a previous frame of the video image, wherein the feature location represents a location of the each text located on a curve segment between two contour expansion key points on the display path, and the path location represents a curve path length of the each text moving on the display path: the text feature location determining submodule is configured for computing the feature location of the each text in the current video image based on the path location of the each text in the text to be displayed in the current video image: the text screen location determining submodule is configured for determining a screen location of the each text based on the feature location of the each text in the current video image; and the text rendering and displaying submodule is configured for rendering and displaying, in the video image, the text to be displayed, based on the screen location of the each text.

For example, the text path location determining submodule is configured for: determining a moving speed of the text to be displayed based on a text life cycle in the text display parameter and a curve length of the display path: determining a path location of the first text in the current video image, based on the moving speed of the text to be displayed and the feature location of the first text in the text to be displayed in the previous frame of the video image; and determining, in the current video image, the path location of the each text in the text to be displayed, based on the path location of the first text in the current video image and a text display interval in the text display parameter.

For example, the text path location determining submodule is configured for: integrating the feature location of the first text in the previous frame of video image by adopting a predetermined curve integration algorithm, and determining, in the current video image, an initial path location corresponding to the feature location of the first text in the previous frame of the video image: determining a moving distance of the first text, based on a time interval between the current video image and the previous frame of the video image, and the moving speed of the text to be displayed; and superposing the moving distance on the basis of the initial path location, to determine, in the current video image, the path location of the first text.

For example, the text rendering and displaying submodule is configured for: rendering the text to be displayed at the screen location of the each text based on a text font and a text size in the text display parameter; and superposing a rendering effect of the each text on the video image for display.

For example, the target object comprises a character image in the video image.

The apparatus for displaying a text effect provided by embodiments of the present disclosure can perform the method of displaying a text effect provided in any embodiments of the present disclosure and have the corresponding functional modules and beneficial effects to perform the method.

It is to be noted that units and modules included in the preceding apparatus are divided according to function logic, and these units and modules may also be divided in other manners as long as the corresponding functions can be achieved. Moreover, the specific names of function units are used for distinguishing between each other and not intended to limit the scope of embodiments of the present disclosure.

Figure 13:
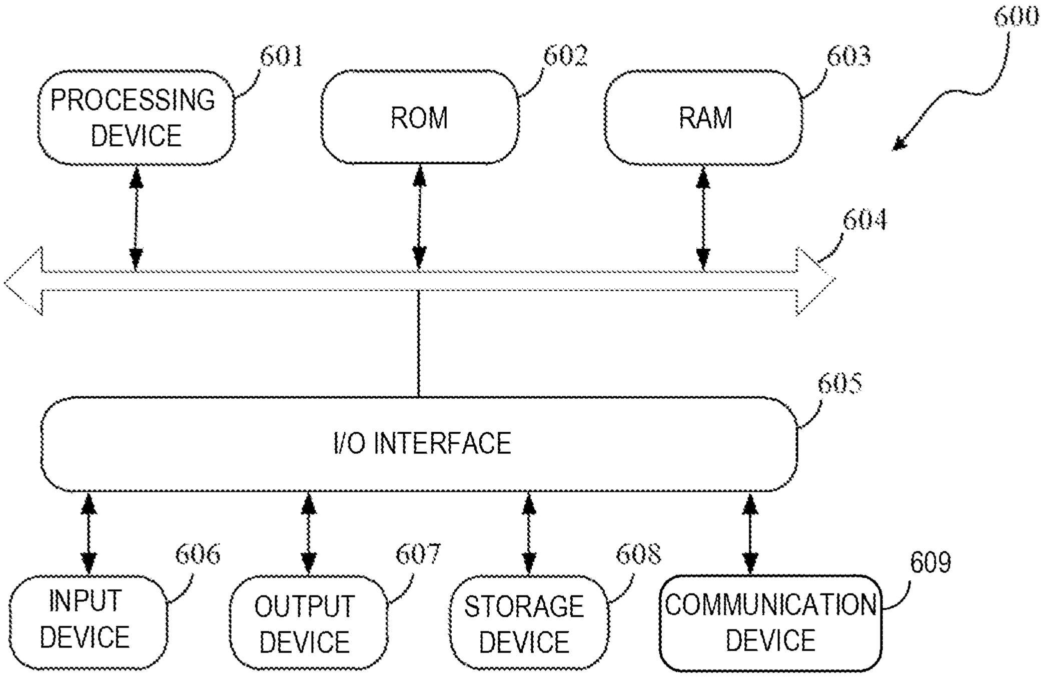
FIG. 13 is a schematic structural diagram of an electronic device provided by one embodiment of the present disclosure.

Referring now to FIG. 13, which shows a schematic structural diagram of an electronic device (e.g., a terminal device or server in FIG. 13) 600 suitable for implementing embodiments of the present disclosure. A terminal device in embodiments of the present disclosure may include, but is not limited to, mobile terminals such as a mobile phone, a laptop, a digital broadcast receiver, a PDA (personal digital assistant), a PAD, a PMP (portable media player), and an in-vehicle terminal (such as an in-vehicle navigation terminal) and stationary terminals such as a digital television (TV) and a desktop computer. The electronic device shown in FIG. 13 is merely an example and is not intended to limit the function and usage scope of embodiments of the present disclosure.

As shown in FIG. 13, the electronic device 600 may include a processing device (such as a central processing unit, graphics processing unit, etc.) 601, which can perform various appropriate actions and processes based on programs stored in Read-Only Memory (ROM) 602 or loaded from storage device 606 into Random Access Memory (RAM) 603. In RAM 603, various programs and data required for the operation of the electronic device 600 are also stored. The processing device 601. ROM 602, and RAM 603 are connected to each other through a bus 604. The input/output (I/O) interface 605 is also connected to the bus 604.

Generally, the following devices can be connected to the I/O interface 605: input devices 606 including, such as touch screens, touchpads, keyboards, mice, cameras, microphones, accelerometers, gyroscopes, etc.: output devices 607 including, for example, liquid crystal displays (LCDs), speakers, vibrators, etc.: storage devices 608 including, such as magnetic tapes, hard disks, etc.; and communication devices 609. Communication devices 609 can allow electronic devices 600 to communicate wirelessly or wirelessly with other devices to exchange data. Although FIG. 13 shows an electronic device 600 with multiple devices, it should be understood that it is not required to implement or have all of the illustrated devices. More or fewer devices can be implemented or provided alternatively.

According to embodiments of the present disclosure, the process described above with reference to the flowchart can be implemented as a computer software program. For example, embodiments of the present disclosure include a computer program product that includes a computer program carried on a non-transitory computer-readable medium, the computer program containing program code for performing the method shown in the flowchart. In such embodiments, the computer program can be downloaded and installed from the network through the communication device 609, or installed from the storage device 606, or installed from the ROM 602. When the computer program is executed by the processing device 601, the above functions defined in the method of displaying a text effect of the embodiments of the present disclosure are performed.

The electronic device provided in this embodiment of the present disclosure and the method of displaying a text effect provided in the above embodiments belong to the same inventive concept, technical details not described in detail in the present embodiment may refer to the above embodiments, and the present embodiment has the same beneficial effects as the above embodiments.

Embodiments of the present disclosure provides a computer storage storing a computer program. When the program is executed by a processor, the method of displaying a text effect provided in the above embodiments is implemented.

It is to be noted that the preceding computer-readable medium in the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as the HyperText Transfer Protocol (HTTP), and may be interconnected with any form or medium of digital data communication (such as a communication network). Examples of the communication network include a local area network ("LAN"), a wide area network ("WAN"), an internet (such as the Internet) and a peer-to-peer network (such as an ad hoc network), as well as any currently known or future developed network.

The computer-readable medium may be included in the electronic device or may exist alone without being assembled into the electronic device.

The computer-readable medium carries one or more programs, the one or more programs when executed by the electronic device, cause the electronic device to: if text information to be displayed and a text display parameter are obtained, obtain a video image for displaying the text information to be displayed: identify key location points of a target object in the video image and determine a display path of the text to be displayed based on the key location points; and display, based on the text display parameter, the text information to be displayed dynamically according to the display path.

Computer program codes for performing the operations in the present disclosure may be written in one or more programming languages or combination thereof. The preceding one or more programming languages include, but are not limited to, object-oriented programming languages such as Java. Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or connected to an external computer (for example, through the Internet using an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flow charts may be implemented by a specific-purpose hardware-based system which performs specified functions or operations or a combination of specific-purpose hardware and computer instructions.

The units described in the embodiments of the present disclosure can be implemented by software or hardware. The names of units and modules do not limit the unit or module itself in some cases. For example, the data generating module can also be described as a "video data generating module".

The functions described above herein may be executed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device, or any appropriate combination thereof.

According to one or more embodiments of the present disclosure, a method of displaying a text effect is provided. In the method, if text information to be displayed and a text display parameter are obtained, a video image for displaying the text information to be displayed are obtained: key location points of a target object in the video image are identified and a display path of the text to be displayed is determined based on the key location points; and based on the text display parameter, the text information to be displayed is displayed dynamically according to the display path.

According to one or more embodiments of the present disclosure, in the method of displaying a text effect, the determining a display path of the text to be displayed based on the key location points comprises: if the key location points comprise all essential key location points, determining contour expansion key points corresponding to the key location points based on location information of the key location points and a predetermined contour expansion parameter; and performing a contour curve fitting based on the contour expansion key points and determining the fitted target contour expansion curve as the display path.

According to one or more embodiments of the present disclosure, for example, in response to determining that the key location points fail to contain all essential key location points, the method further comprises: determining whether the key location points contain all predetermined benchmark key location points: if the key location points contain all predetermined benchmark key location points, supplementing an essential key location point that fails to be contained in the key location points, based on location information of a predetermined benchmark key location point in the key location points and a size ratio of a standard reference model of the target object: if the key location points fail to contain all the predetermined benchmark key location points, terminating a display processing process of a current text effect.

According to one or more embodiments of the present disclosure, in the method of displaying a text effect, for example, the determining contour expansion key points corresponding to the key location points based on location information of the key location points and a predetermined contour expansion parameter comprises: determining, on a contour line of the target object, a contour key point corresponding to the key location points; and superposing a contour expansion distance determined based on the predetermined contour expansion parameter on the basis of location information of the contour key point, to obtain location information of the contour expansion key points.

According to one or more embodiments of the present disclosure, in the method of displaying a text effect, for example, the performing a contour curve fitting based on the contour expansion key points comprises: supplementing the contour expansion key points based on a predetermined contour expansion key point location relationship; and performing the contour curve fitting based on the supplemented contour expansion key points.

According to one or more embodiments of the present disclosure, the method further comprises: for example, before the determining contour expansion key points corresponding to the key location points, taking a median value of location information of the key location points in a plurality of consecutive frames of video images as location information of the key location points.

According to one or more embodiments of the present disclosure, in the method of displaying a text effect, for example, displaying, based on the text display parameter, the text information to be displayed dynamically according to the display path further comprises: determining, in a current video image, a path location of each text in the text to be displayed, based on the text display parameter, a curve of the display path, and a feature location of a first text in the text to be displayed in a previous frame of the video image, wherein the feature location represents a location of the each text located on a curve segment between two contour expansion key points on the display path, and the path location represents a curve path length of the each text moving on the display path: computing the feature location of the each text in the current video image based on the path location of the each text in the text to be displayed in the current video image: determining a screen location of the each text based on the feature location of the each text in the current video image; and rendering and displaying, in the video image, the text to be displayed, based on the screen location of the each text.

According to one or more embodiments of the present disclosure, in the method of displaying a text effect, for example, the determining, in a current video image, a path location of each text in the displayed text, based on the text display parameter, a curve of the display path, and a feature location of a first text in the text to be displayed in a previous frame of the video image comprises: determining a moving speed of the text to be displayed based on a text life cycle in the text display parameter and a curve length of the display path: determining a path location of the first text in the current video image, based on the moving speed of the text to be displayed and the feature location of the first text in the text to be displayed in the previous frame of the video image; and determining, in the current video image, the path location of the each text in the text to be displayed, based on the path location of the first text in the current video image and a text display interval in the text display parameter.

According to one or more embodiments of the present disclosure, in the method of displaying a text effect, for example, the determining a path location of the first text in the current video image, based on the moving speed of the text to be displayed and the feature location of the first text in the text to be displayed in the previous frame of the video image comprises: integrating the feature location of the first text in the previous frame of video image by adopting a predetermined curve integration algorithm, and determining, in the current video image, an initial path location corresponding to the feature location of the first text in the previous frame of the video image: determining a moving distance of the first text, based on a time interval between the current video image and the previous frame of the video image, and the moving speed of the text to be displayed; and superposing the moving distance on the basis of the initial path location, to determine, in the current video image, the path location of the first text.

According to one or more embodiments of the present disclosure, in the method of displaying a text effect, for example, the rendering and displaying, in the video image, the text to be displayed, based on the screen location of the each text comprises: rendering the text to be displayed at the screen location of the each text based on a text font and a text size in the text display parameter; and superposing a rendering effect of the each text on the video image for display.

According to one or more embodiments of the present disclosure, in the method of displaying a text effect, for example, the target object comprises a character image in the video image.

According to one or more embodiments of the present disclosure, an apparatus for displaying a text effect is provided. The apparatus for displaying a text effect comprises: a text effect display data obtaining module configured for, in response to determining that text information to be displayed and a text display parameter are obtained, obtaining a video image for displaying the text information to be displayed: a text effect display path determining module configured for identifying key location points of a target object in the video image, and determining a display path of the text to be displayed based on the key location points; and a text effect displaying module configured for displaying, based on the text display parameter, the text information to be displayed dynamically according to the display path.

According to one or more embodiments of the present disclosure, in the apparatus for displaying a text effect, for example, the text effect display path determining module specifically includes a contour expansion key point determining submodule and a path curve fitting submodule: where, the contour expansion key point determining submodule is configured for, if the key location points comprise all essential key location points, determining contour expansion key points corresponding to the key location points based on location information of the key location points and a predetermined contour expansion parameter: the path curve fitting submodule is configured for performing a contour curve fitting based on the contour expansion key points and determining the fitted target contour expansion curve as the display path.

According to one or more embodiments of the present disclosure, in the apparatus for displaying a text effect, for example, the text effect display path determining module further includes a key location point supplementing submodule, which is configured for: determining whether the key location points contain all predetermined benchmark key location points: if the key location points contain all predetermined benchmark key location points, supplementing an essential key location point that fails to be contained in the key location points, based on location information of a predetermined benchmark key location point in the key location points and a size ratio of a standard reference model of the target object; and if the key location points fail to contain all the predetermined benchmark key location points, terminating a display processing process of a current text effect.

According to one or more embodiments of the present disclosure, in the apparatus for displaying a text effect, for example, the contour expansion key point determining submodule is configured for: determining, on a contour line of the target object, a contour key point corresponding to the key location points; and superposing a contour expansion distance determined based on the predetermined contour expansion parameter on the basis of location information of the contour key point, to obtain location information of the contour expansion key points.

According to one or more embodiments of the present disclosure, in the apparatus for displaying a text effect, for example, the path curve fitting submodule is configured for supplementing the contour expansion key points based on a predetermined contour expansion key point location relationship; and performing the contour curve fitting based on the supplemented contour expansion key points.

According to one or more embodiments of the present disclosure, for example, the apparatus for displaying a text effect further includes a key location point information correcting module, which is configured for, before determining the contour expansion key point corresponding to the key location points, taking a median value of location information of the key location points in a plurality of consecutive frames of video images as location information of the key location points.

According to one or more embodiments of the present disclosure, in the apparatus for displaying a text effect, for example, the text effect displaying module includes: a text path location determining submodule, a text feature location determining submodule, a text screen location determining submodule, and a text rendering and displaying submodule: where the text path location determining submodule is configured for determining, in a current video image, a path location of each text in the text to be displayed, based on the text display parameter, a curve of the display path, and a feature location of a first text in the text to be displayed in a previous frame of the video image, wherein the feature location represents a location of the each text located on a curve segment between two contour expansion key points on the display path, and the path location represents a curve path length of the each text moving on the display path: the text feature location determining submodule is configured for computing the feature location of the each text in the current video image based on the path location of the each text in the text to be displayed in the current video image: the text screen location determining submodule is configured for determining a screen location of the each text based on the feature location of the each text in the current video image; and the text rendering and displaying submodule is configured for rendering and displaying, in the video image, the text to be displayed, based on the screen location of the each text.

According to one or more embodiments of the present disclosure, in the apparatus for displaying a text effect, for example, the text path location determining submodule is configured for determining a moving speed of the text to be displayed based on a text life cycle in the text display parameter and a curve length of the display path: determining a path location of the first text in the current video image, based on the moving speed of the text to be displayed and the feature location of the first text in the text to be displayed in the previous frame of the video image; and determining, in the current video image, the path location of the each text in the text to be displayed, based on the path location of the first text in the current video image and a text display interval in the text display parameter.

According to one or more embodiments of the present disclosure, in the apparatus for displaying a text effect, for example, the text path location determining submodule is configured for integrating the feature location of the first text in the previous frame of video image by adopting a predetermined curve integration algorithm, and determining, in the current video image, an initial path location corresponding to the feature location of the first text in the previous frame of the video image: determining a moving distance of the first text, based on a time interval between the current video image and the previous frame of the video image, and the moving speed of the text to be displayed; and superposing the moving distance on the basis of the initial path location, to determine, in the current video image, the path location of the first text.

According to one or more embodiments of the present disclosure, in the apparatus for displaying a text effect, for example, the text rendering and displaying submodule is configured for rendering the text to be displayed at the screen location of the each text based on a text font and a text size in the text display parameter; and superposing a rendering effect of the each text on the video image for display.

According to one or more embodiments of the present disclosure, in the apparatus for displaying a text effect, for example, the target object comprises a character image in the video image.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

We claim:

1. A method of displaying a text effect, comprising:

in response to determining that text information to be displayed and a text display parameter are obtained, obtaining a video image for displaying the text information to be displayed;

identifying key location points of a target object in the video image and determining a display path of the text information to be displayed based on the key location points, wherein the determining the display path of the text information to be displayed based on the key location points comprises:

in response to determining that the key location points comprise all essential key location points, determining contour expansion key points corresponding to the key location points based on location information of the key location points and a predetermined contour expansion parameter; and performing a contour curve fitting based on the contour expansion key points and determining a fitted target contour expansion curve as the display path; and displaying, based on the text display parameter, the text information to be displayed dynamically according to the display path.

2. The method of claim 1, wherein in response to determining that the key location points fail to contain all essential key location points, the method further comprises:

determining whether the key location points contain all predetermined benchmark key location points;

in response to determining that the key location points contain all predetermined benchmark key location points, supplementing an essential key location point that fails to be contained in the key location points, based on location information of a predetermined benchmark key location point in the key location points and a size ratio of a standard reference model of the target object; and in response to determining that the key location points fail to contain all the predetermined benchmark key location points, terminating a display processing process of a current text effect.

3. The method of claim 1, wherein the determining contour expansion key points corresponding to the key location points based on location information of the key location points and a predetermined contour expansion parameter comprises:

determining, on a contour line of the target object, a contour key point corresponding to the key location points; and superposing a contour expansion distance determined based on the predetermined contour expansion parameter on the basis of location information of the contour key point, to obtain location information of the contour expansion key points.

4. The method of claim 3, wherein the performing a contour curve fitting based on the contour expansion key points comprises:

supplementing the contour expansion key points based on a predetermined contour expansion key point location relationship; and performing the contour curve fitting based on the supplemented contour expansion key points.

5. The method of claim 1, before the determining contour expansion key points corresponding to the key location points, the method further comprising:

taking a median value of location information of the key location points in a plurality of consecutive frames of video images as location information of the key location points.

6. The method of claim 1, wherein the text information to be displayed comprises a plurality of texts, and the displaying, based on the text display parameter, the text information to be displayed dynamically according to the display path comprises:

determining, in a current video image, a path location of each text in the text information to be displayed, based on the text display parameter, a curve of the display path, and a feature location of a first text in the text information to be displayed in a previous frame of the video image, wherein the feature location represents a location of the each text located on a curve segment between two contour expansion key points on the display path, and the path location represents a curve path length of the each text moving on the display path;

computing the feature location of the each text in the current video image based on the path location of the each text in the text information to be displayed in the current video image;

determining a screen location of the each text based on the feature location of the each text in the current video image; and rendering and displaying, in the video image, the text information to be displayed, based on the screen location of the each text.

7. The method of claim 6, wherein the determining, in a current video image, a path location of each text in the text information to be displayed, based on the text display parameter, a curve of the display path, and a feature location of a first text in the text information to be displayed in a previous frame of the video image comprises:

determining a moving speed of the text information to be displayed based on a text life cycle in the text display parameter and a curve length of the display path;

determining a path location of the first text in the current video image, based on the moving speed of the text information to be displayed and the feature location of the first text in the text information to be displayed in the previous frame of the video image; and determining, in the current video image, the path location of the each text in the text information to be displayed, based on the path location of the first text in the current video image and a text display interval in the text display parameter.

8. The method of claim 7, wherein the determining a path location of the first text in the current video image, based on the moving speed of the text information to be displayed and the feature location of the first text in the text information to be displayed in the previous frame of the video image comprises:

integrating the feature location of the first text in the previous frame of video image by adopting a predetermined curve integration algorithm, and determining, in the current video image, an initial path location corresponding to the feature location of the first text in the previous frame of the video image;

determining a moving distance of the first text, based on a time interval between the current video image and the previous frame of the video image, and the moving speed of the text information to be displayed; and superposing the moving distance on the basis of the initial path location, to determine, in the current video image, the path location of the first text.

9. The method of claim 6, wherein the rendering and displaying, in the video image, the text information to be displayed, based on the screen location of the each text comprises:

rendering the text information to be displayed at the screen location of the each text based on a text font and a text size in the text display parameter; and superposing a rendering effect of the each text on the video image for display.

10. The method of claim 1, wherein the target object comprises a character image in the video image.

11. An electronic device, comprising:

one or more processors;

a storage device configured to store one or more programs, wherein the one or more programs, when executed by the one or more processors, cause the one or more processors implement acts comprising:

in response to determining that text information to be displayed and a text display parameter are obtained, obtaining a video image for displaying the text information to be displayed;

identifying key location points of a target object in the video image and determining a display path of the text information to be displayed based on the key location points, wherein the determining the display path of the text information to be displayed based on the key location points comprises:

in response to determining that the key location points comprise all essential key location points, determining contour expansion key points corresponding to the key location points based on location information of the key location points and a predetermined contour expansion parameter; and performing a contour curve fitting based on the contour expansion key points and determining a fitted target contour expansion curve as the display path; and displaying, based on the text display parameter, the text information to be displayed dynamically according to the display path.

12. The device of claim 11, wherein in response to determining that the key location points fail to contain all essential key location points, the acts further comprise:

determining whether the key location points contain all predetermined benchmark key location points;

in response to determining that the key location points contain all predetermined benchmark key location points, supplementing an essential key location point that fails to be contained in the key location points, based on location information of a predetermined benchmark key location point in the key location points and a size ratio of a standard reference model of the target object; and in response to determining that the key location points fail to contain all the predetermined benchmark key location points, terminating a display processing process of a current text effect.

13. The device of claim 11, wherein the determining contour expansion key points corresponding to the key location points based on location information of the key location points and a predetermined contour expansion parameter comprises:

determining, on a contour line of the target object, a contour key point corresponding to the key location points; and superposing a contour expansion distance determined based on the predetermined contour expansion parameter on the basis of location information of the contour key point, to obtain location information of the contour expansion key points.

14. The device of claim 13, wherein the performing a contour curve fitting based on the contour expansion key points comprises:

supplementing the contour expansion key points based on a predetermined contour expansion key point location relationship; and performing the contour curve fitting based on the supplemented contour expansion key points.

15. The device of claim 11, before the determining contour expansion key points corresponding to the key location points, the acts further comprising:

taking a median value of location information of the key location points in a plurality of consecutive frames of video images as location information of the key location points.

16. The device of claim 11, wherein the text information to be displayed comprises a plurality of texts, and the displaying, based on the text display parameter, the text information to be displayed dynamically according to the display path comprises:

determining, in a current video image, a path location of each text in the text information to be displayed, based on the text display parameter, a curve of the display path, and a feature location of a first text in the text information to be displayed in a previous frame of the video image, wherein the feature location represents a location of the each text located on a curve segment between two contour expansion key points on the display path, and the path location represents a curve path length of the each text moving on the display path;

computing the feature location of the each text in the current video image based on the path location of the each text in the text information to be displayed in the current video image;

determining a screen location of the each text based on the feature location of the each text in the current video image; and rendering and displaying, in the video image, the text information to be displayed, based on the screen location of the each text.

17. The device of claim 16, wherein the determining, in a current video image, a path location of each text in the text information to be displayed, based on the text display parameter, a curve of the display path, and a feature location of a first text in the text information to be displayed in a previous frame of the video image comprises:

determining a moving speed of the text information to be displayed based on a text life cycle in the text display parameter and a curve length of the display path;

determining a path location of the first text in the current video image, based on the moving speed of the text to information be displayed and the feature location of the first text in the text information to be displayed in the previous frame of the video image; and determining, in the current video image, the path location of the each text in the text information to be displayed, based on the path location of the first text in the current video image and a text display interval in the text display parameter.

18. A non-transitory storage medium comprising computer-executable instructions, wherein the computer-executable instructions, when executed by a computer processor, are configured to perform acts comprising:

in response to determining that text information to be displayed and a text display parameter are obtained, obtaining a video image for displaying the text information to be displayed;

identifying key location points of a target object in the video image and determining a display path of the text information to be displayed based on the key location points, wherein the determining the display path of the text information to be displayed based on the key location points comprises:

in response to determining that the key location points comprise all essential key location points, determining contour expansion key points corresponding to the key location points based on location information of the key location points and a predetermined contour expansion parameter; and performing a contour curve fitting based on the contour expansion key points and determining a fitted target contour expansion curve as the display path; and displaying, based on the text display parameter, the text information to be displayed dynamically according to the display path.

* * * * *